Jan. 28, 1969    G. A. BAHM ETAL    3,423,827
DENTAL BRIDGE
Filed Nov. 10, 1965

INVENTORS
Glenn A. Bahm
James A. Andrews
BY
Hovey, Schmidt, Johnson & Hovey
ATTORNEYS

United States Patent Office 3,423,827
Patented Jan. 28, 1969

3,423,827
DENTAL BRIDGE
Glenn A. Bahm, Independence, and James A. Andrews, Amite, La., assignors to Hygienic Bridgework, Incorporated, Amite, La., a corporation of Louisiana
Filed Nov. 10, 1965, Ser. No. 507,180
U.S. Cl. 32—5
Int. Cl. A61c *13/22*
1 Claim

ABSTRACT OF THE DISCLOSURE

A dental bridge for positioning one or more pontics in the mouth, the bridge including a pair of spaced, parallel bars each completely spanning the distance between a pair of spaced abutment teeth and a sleeve having a pair of channels therein which are adapted to embrace the bars, the pontics being carried by the sleeve. The bars and the sleeve are of complementary, curvilinear configuration, the bars being rectangular in transverse cross section, the sleeve being W-shaped in transverse cross section whereby to present said pair of channels. At least one of each of the faces which are in engagement when the bars are embraced by the channels is provided with a plurality of serrations whereby the bars and the sleeve are retained in engagement.

---

This invention relates to a dental bridge and, more particularly, to a bridge having improved retaining characteristics to maintain the same in the desired position in a person's dental arch.

It is the primary object of this invention to provide means for removably interconnecting a dental bridge by providing a pontic with a dual sleeve and the arch with complemental bar means, whereby the sleeve is adapted to embrace the bar means to removably retain the bridge with respect to the arch.

An important object of the present invention is to provide a bridge which may be particularly utilized in the posterior portion of the mouth by making the sleeve and bars curvilinear in configuration whereby to conform to the natural curvature of the teeth.

Another important object is to provide a double sleeve for use in the aforementioned manner wherein a substantially W-shaped configuration is presented to define three spaced-apart legs, the inner faces of the legs being provided with a plurality of serrations. Twin bars are utilized and likewise provided with a plurality of serrations, the serrated areas of the sleeve and bars being in face-to-face engagement when the sleeve embraces the bars for optimum frictional retention of the pontic in the arch.

Figure 1:
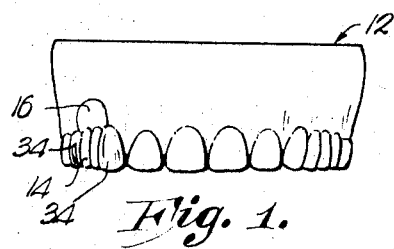
Figure 4:
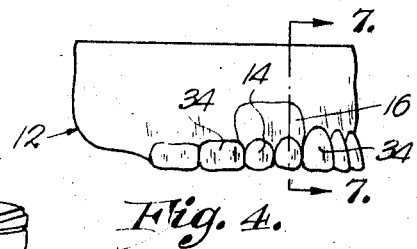
Figure 11:
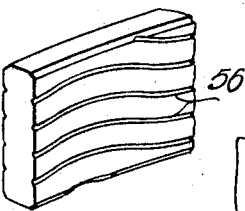
Figure 2:
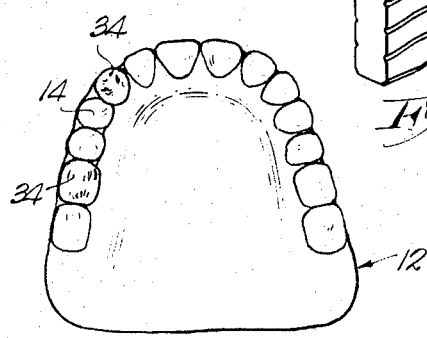
Figure 5:
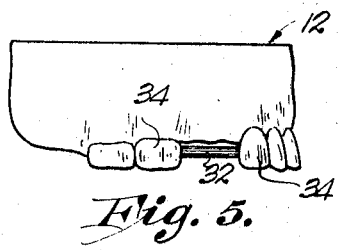
Figure 6:
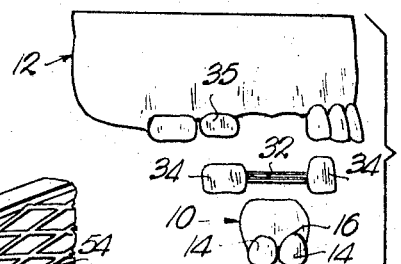
Figure 3:
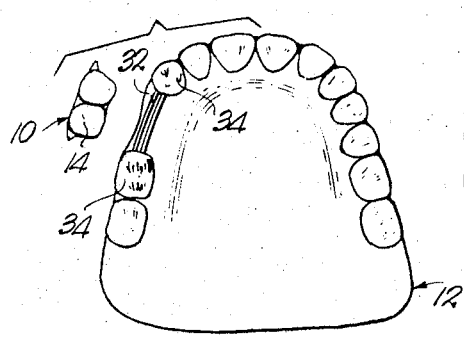
Figure 10:
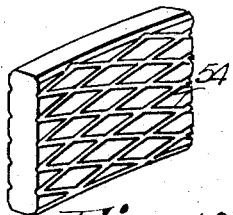
Figure 9:
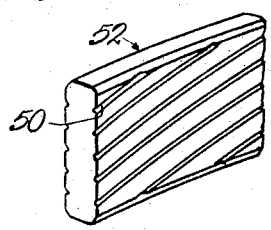
Figure 7:
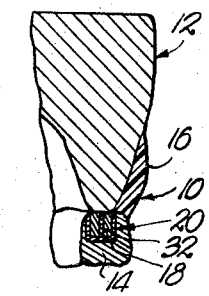
Figure 8:
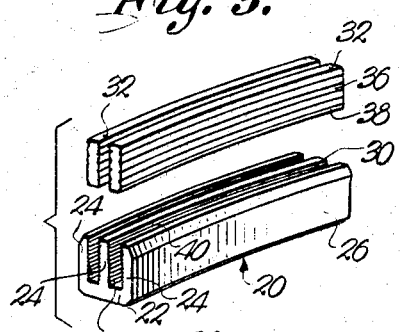

FIGURE 1 is a front elevational view of an upper arch showing the bridge in position therein; FIG. 2 is a bottom plan view thereof; FIG. 3 is a view similar to FIG. 2 but showing the bridge removed; FIG. 4 is a side elevational view thereof; FIG. 5 is a side elevational view thereof showing the bridge removed; FIG. 6 is an exploded view similar to FIG. 4 showing the bridge and crown removed; FIG. 7 is an enlarged, cross-sectional view taken along line 7—7 of FIG. 4; FIG. 8 is an enlarged, fragmentary, exploded perspective view showing the bar means and sleeve; and FIGS. 9, 10 and 11 are enlarged, fragmentary, perspective views of modified forms of the bar.

The bridge, broadly designated by the numeral 10, is designed for insertion into an arch designated as 12, the specific embodiment of this invention illustrated in the drawing showing an upper arch wherein the bridge consists of the first and second premolars constituting the pontics, although it will be appreciated that any one or more pontics may constitute the bridge within the contemplation of this invention.

Thus, the bridge as illustrated, consists of two pontics 14 and an artificial tissue portion 16 molded in surrounding relationship to the upper portion of the pontic whereby, when the bridge is inserted into the arch in a manner hereinafter described, the same will be complementary thereto whereby a realistic appearance is presented.

In order that the bridge 10 may be removably inserted in the arch 12, pontics 14 have the rear faces thereof provided with a slot 18, which slot receives a curvilinear sleeve 20, the sleeve 20 being seated in the slot 18 and suitably secured therein as by adhesive or the like.

Sleeve 20 is W-shaped in transverse cross-sectional configuration whereby to present a bight 22 and three spaced, normally vertically disposed legs 24, the sleeve having an outer face 26 and a pair of inner, U-shaped faces 28, the inner faces 28 defining a pair of curvilinear channels or grooves 30. The outer surface 26 may be knurled to improve its retention characteristics within slot 18.

In order to receive the bridge 10, arch 12 is provided with a pair of spaced, parallel, curvilinear bars 32 which span the distance between a pair of spaced-apart crowns 34 which are capped onto abutment teeth 35 which, in the illustrated form, comprise the patient's first molars disposed adjacent the ends of the bridge (FIG. 6). The bars 32 are suitably secured to crowns 34 by fusing each end of the bars to their corresponding crowns and then capping crowns 34 onto teeth 35 in a well-known manner.

Bars 32 are polygonal in configuration whereby each presents a pair of opposed sidewalls 36, such sidewalls having a plurality of parallel, longitudinally extending serrations 38 formed thereupon, whereby a corrugated surface is presented throughout the width and length of sidewalls 36.

The inner faces 28 of legs 24 of sleeve 20 are likewise provided with a plurality of parallel, longitudinally extending serrations 40 whereby the inner faces 28 of the legs 24 are corrugated throughout the width and length thereof, it being noted that serrations 38 of bars 32 and serrations 40 of legs 24 of sleeve 20 extend the full length of their corresponding members. Various serration configurations are suitable, including U-shaped, V-shaped, and irregular patterns.

The distance between legs 24 of sleeve 20, that is the width of channels 30 is substantially the same as the width of each bar 32 the depth of channel 30 is substantially equal in height to the height of bars 32, and the width of central leg 24 is substantially equal to the distance between bars 32, all to the end that bars 32 may be complementally received within grooves 30 of sleeve 20, as best shown in FIG. 7.

Thus, when it is desired to position bridge 10 in arch 12, the pontics 14 constituting bridge 10 can be grasped and the bridge positioned in such a manner that channels 30 face upwardly in position to be moved into embracing relationship with corresponding bars 32. The pontics are then positioned at their desired locations with respect to arch 12 and the sleeve 20 shifted upwardly into tight frictional engagement with bars 32, it being appreciated that the curvilinear configuration of sleeve 20 and bars 32 is identical so that the same may mate upon the sleeve being moved into embracing relationship with the bars.

When the bridge is thus positioned, it will be appreciated that the corrugated inner faces of the legs 24 are in overlying mating engagement with the corrugated sidewalls of the bars 32, all to the end that the sleeve 20 may be frictionally retained by the bars 32 by virtue of the interengagement of the corresponding corrugated surfaces.

It will also be appreciated that, while the above described mating relationship will retain the bridge 10 in the desired position in arch 12, the same bridge may nevertheless be easily removed for cleaning purposes and the like.

As indicated above, the bridge illustrated in the drawing constitutes the first and second premolars which form a section of the posterior portion of the arch, and thus the sleeve and the bars are curvilinear in configuration, it being appreciated that the particular configuration of said bars and sleeve may be modified to most attractively accommodate the bridge to the arch. It will also be appreciated that, if the bridge were to constitute other teeth of the arch, the bar means and the sleeve would be of the desired configuration, be it curvilinear or straight.

Thus, there is presented an aesthetically pleasing bridge having optimum retention characteristics through the provision of a dual channelled sleeve and complementally received twin bar means. The bridge may be easily inserted and removed for repair, change or cleaning, and is of simplified and economical construction.

Modified bar serration patterns are shown in FIGS. 9, 10 and 11. In the bar shown in FIG. 9, there is provided a plurality of parallel, diagonally disposed, V-shaped serrations 50 formed in a bar 52 for use in the same manner as described above for bars 32. In FIG. 10, the serrations 54 are diamond-shaped, while in FIG. 11, an ogee configuration is provided as shown by serrations 56. In any event, the serrations on the bars and sleeve are preferably minute in character.

If desired, inner faces 28 of legs 24 of sleeve 20 may be smooth, as retention over a prolonged period is still provided by the frictional engagement action of serrations 38 of bars 32.

Having thus described the invention, what is claimed as new and desired to be secured by Letters Patent is:

1. A dental bridge comprising:
   a pair of spaced, parallel curvilinear bars each completely spanning the distance between a pair of spaced-apart abutments, each end of each bar being secured to a corresponding abutment, said bars each being polygonal whereby to each present a pair of opposed sidewalls, said sidewalls having corrugations thereon;
   a curvilinear sleeve having a pair of channels formed therein each adapted to frictionally embrace a corresponding bar, there being at least one pontic secured to said sleeve, said sleeve having an outer face and a pair of U-shaped inner faces, said inner faces defining said channels, the inner faces being engaged by said corrugations when the sleeve embraces the bars, said pontic being secured to said outer face, the curvilinear configuration of the bars and the sleeve being identical, each being in its entirety the arc of a common circle.

References Cited

UNITED STATES PATENTS

| | | | |
|---|---|---|---|
| 1,140,537 | 5/1915 | Skinner | 32—5 |
| 1,116,371 | 11/1914 | Bennett | 32—5 |
| 1,302,499 | 5/1919 | Bennett | 32—5 |
| 2,158,211 | 5/1939 | Aitken | 273—193 XR |
| 2,558,367 | 6/1951 | Madsen | 24—201 |
| 2,826,814 | 3/1958 | Sappey | 32—5 |
| 3,231,281 | 1/1966 | Wallo | 273—193 |

FOREIGN PATENTS

| | | |
|---|---|---|
| 375,235 | 9/1939 | Italy. |

ROBERT PESHOCK, *Primary Examiner.*